US012499693B2

United States Patent
Gupta et al.

(10) Patent No.: US 12,499,693 B2
(45) Date of Patent: Dec. 16, 2025

(54) VEHICLE INTERIOR CAMERA SYSTEMS

(71) Applicant: GM GLOBAL TECHNOLOGY OPERATIONS LLC, Detroit, MI (US)

(72) Inventors: Siddhartha Gupta, Rochester Hills, MI (US); Sean Taylor Coughlin, Shelby Township, MI (US); Maria Del Mar Davila, Clawson, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/634,491

(22) Filed: Apr. 12, 2024

(65) Prior Publication Data
US 2025/0322671 A1    Oct. 16, 2025

(51) Int. Cl.
| | |
|---|---|
| *G06V 20/59* | (2022.01) |
| *B60W 50/14* | (2020.01) |
| *G06T 7/11* | (2017.01) |
| *G06T 7/194* | (2017.01) |
| *G06T 7/20* | (2017.01) |
| *G06V 10/25* | (2022.01) |

(52) U.S. Cl.
CPC ............ *G06V 20/59* (2022.01); *B60W 50/14* (2013.01); *G06T 7/11* (2017.01); *G06T 7/194* (2017.01); *G06T 7/20* (2013.01); *G06V 10/25* (2022.01); *G06T 2207/20132* (2013.01); *G06V 2201/07* (2022.01)

(58) Field of Classification Search
CPC .... G06V 20/59; G06V 10/25; G06V 2201/07; G06T 7/11; G06T 7/20; G06T 7/194; G06T 2207/20132; B60W 50/14
See application file for complete search history.

(56) References Cited

U.S. PATENT DOCUMENTS

| | | | |
|---|---|---|---|
| 2009/0092284 A1* | 4/2009 | Breed | B60N 2/0028 |
| | | | 382/103 |
| 2015/0334398 A1* | 11/2015 | Socek | H04N 19/182 |
| | | | 375/240.26 |
| 2019/0019031 A1* | 1/2019 | Yun | G06T 7/251 |
| 2019/0080450 A1* | 3/2019 | Arar | G06T 7/194 |
| 2019/0156644 A1* | 5/2019 | Lee | G08B 21/24 |
| 2019/0299925 A1* | 10/2019 | Shi | B60N 2/2893 |
| 2019/0347803 A1* | 11/2019 | Lim | G06T 7/11 |
| 2020/0364466 A1* | 11/2020 | Latapie | G06N 3/042 |
| 2022/0222466 A1* | 7/2022 | Hassani | G06V 10/82 |
| 2023/0091178 A1* | 3/2023 | Murata | B60N 2/003 |
| | | | 342/27 |
| 2023/0368350 A1* | 11/2023 | Gilad | G06T 7/70 |
| 2024/0212154 A1* | 6/2024 | Vashist | G06T 7/62 |
| 2024/0303777 A1* | 9/2024 | Wang | G06T 3/14 |

* cited by examiner

Primary Examiner — Peet Dhillon (57) ABSTRACT

An example vehicle interior camera system includes memory configured to store at least one Gaussian process image segmentation model, a vehicle interior camera, and a vehicle control module configured to obtain an image of the interior of the vehicle, extract one or more image crops of a region surrounding a target object in the image, detect and segment a passenger mask in the image, supply the image to the at least one Gaussian process image segmentation model to obtain a region mask associated with the region surrounding the target object, remove the passenger mask from the region mask to extract a target object mask, identify a target object condition according to the target object mask, and control at least one vehicle system or feature in response to identification of the target object condition.

20 Claims, 6 Drawing Sheets

VEHICLE INTERIOR CAMERA SYSTEMS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure generally relates to vehicle interior camera systems, including processes for identifying target object masks for images captured by vehicle interior cameras.

Vehicle interior cameras capture images of objects in an interior of the vehicle. Computer vision and image processing algorithms may use masks to identify objects, but human annotation services for tagging objects to train image processing models are very expensive, time consuming, and may require sharing sensitive passenger data with third party annotation companies.

SUMMARY

An example vehicle interior camera system includes memory configured to store at least one Gaussian process image segmentation model, a vehicle interior camera configured to capture images of at least a portion of an interior of a vehicle, and a vehicle control module configured to obtain an image of at least a portion of the interior of the vehicle, from the vehicle interior camera, extract one or more image crops of a region surrounding a target object in the image, detect and segment a passenger mask in the image, supply the image to the at least one Gaussian process image segmentation model to obtain a region mask associated with the region surrounding the target object, remove the passenger mask from the region mask to extract a target object mask, identify a target object condition according to the target object mask, and control at least one vehicle system or feature in response to identification of the target object condition.

In some examples, the vehicle control module is configured to output the target object mask to train a machine learning model to identify the target object in a sequence of images.

In some examples, the target object includes at least one of a child restraint system (CRS) and a passenger seat belt.

In some examples, controlling the vehicle system or feature includes inhibiting deployment of an airbag in response to detection of a child in a child restraint system.

In some examples, the system includes a human machine interface (HMI) of the vehicle, wherein controlling the vehicle system or feature includes generating an alert via the human machine interface, and the alert includes at least one of a warning not to put a child in a front seat of the vehicle, a warning that a child is still in the vehicle after a key fob leaves the vehicle, or a warning for a passenger to wear a seat belt while the vehicle is in motion.

In some examples, the vehicle control module is configured to obtain a time sequence of k images from the vehicle interior camera, and generate a background motion model according to image crops from each of the k images.

In some examples, the vehicle control module is configured to apply the background motion model to the time sequence of k images to generate a foreground mask.

In some examples, the vehicle control module is configured to remove the foreground mask from an image captured via the vehicle interior camera.

In some examples, removing the foreground mask from the image occurs prior to removing the passenger mask from the region mask, to extract the target object mask.

In some examples, the vehicle control module is configured to determine whether a background motion model update condition is satisfied, and update the background motion model based on a specified number of recent image frames in response to the background motion model update condition being satisfied.

In some examples, the background motion model update condition includes at least one of processing a specified number of image frames since a last background motion model update, and detecting movement of the target object across a sequence of image frames exceeding a threshold movement distance.

In some examples, the vehicle control module is configured to estimate a homography matrix between adjacent frames in the time sequence of k images, and transform the target object mask from a first one of the adjacent frames to a next one of the adjacent frames using the homography matrix.

An example method of processing images of a vehicle interior camera includes obtaining an image of at least a portion of an interior of a vehicle, from a vehicle interior camera, extracting one or more image crops of a region surrounding a target object in the image, detecting and segmenting a passenger mask in the image, supplying the image to at least one Gaussian process image segmentation model to obtain a region mask associated with the region surrounding the target object, removing the passenger mask from the region mask to extract a target object mask, identifying a target object condition according to the target object mas, and controlling at least one vehicle system or feature in response to identification of the target object condition.

In some examples, supplying the target object mask to a machine learning model to train the machine learning model to identify the target object in a sequence of images.

In some examples, the target object includes at least one of a child restraint system (CRS) and a passenger seat belt.

In some examples, controlling the vehicle system or feature includes inhibiting deployment of an airbag in response to detection of a child in a child restraint system.

In some examples, controlling the vehicle system or feature includes generating an alert a human machine interface (HMI), and the alert includes at least one of a warning not to put a child in a front seat of the vehicle, a warning that a child is still in the vehicle after a key fob leaves the vehicle, or a warning for a passenger to wear a seat belt while the vehicle is in motion.

In some examples, the method includes obtaining a time sequence of k images from the vehicle interior camera, and generating a background motion model according to image crops from each of the k images.

In some examples, the method includes applying the background motion model to the time sequence of k images to generate a foreground mask.

In some examples, the method includes removing the foreground mask from an image captured via the vehicle interior camera, prior to removing the passenger mask from the region mask to extract the target object mask.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

In some examples, image processing algorithms and deep-learning models may automate extraction of pixel masks of target objects in images and videos captured by vehicle interior cameras, such as a target object mask for a Child Restraint System (CRS). The extracted target object masks may be used to train machine learning models to improve object detection within the vehicle interior, and may be used to modify operation or function of one or more systems of the vehicle (such as inhibiting deployment of an airbag when a child is detected as sitting in a child restraint system).

In some examples, the target object mask detection algorithms may be used for daytime (e.g., color) images and videos, nighttime (e.g., infrared (IR)) images and videos, monochromatic images (including depth maps), etc. The target object localization and mask segmentation algorithms may be invariant to vehicle seat position, vehicle seat height, and orientation of a child restraint system (or other target object).

Figure 1:
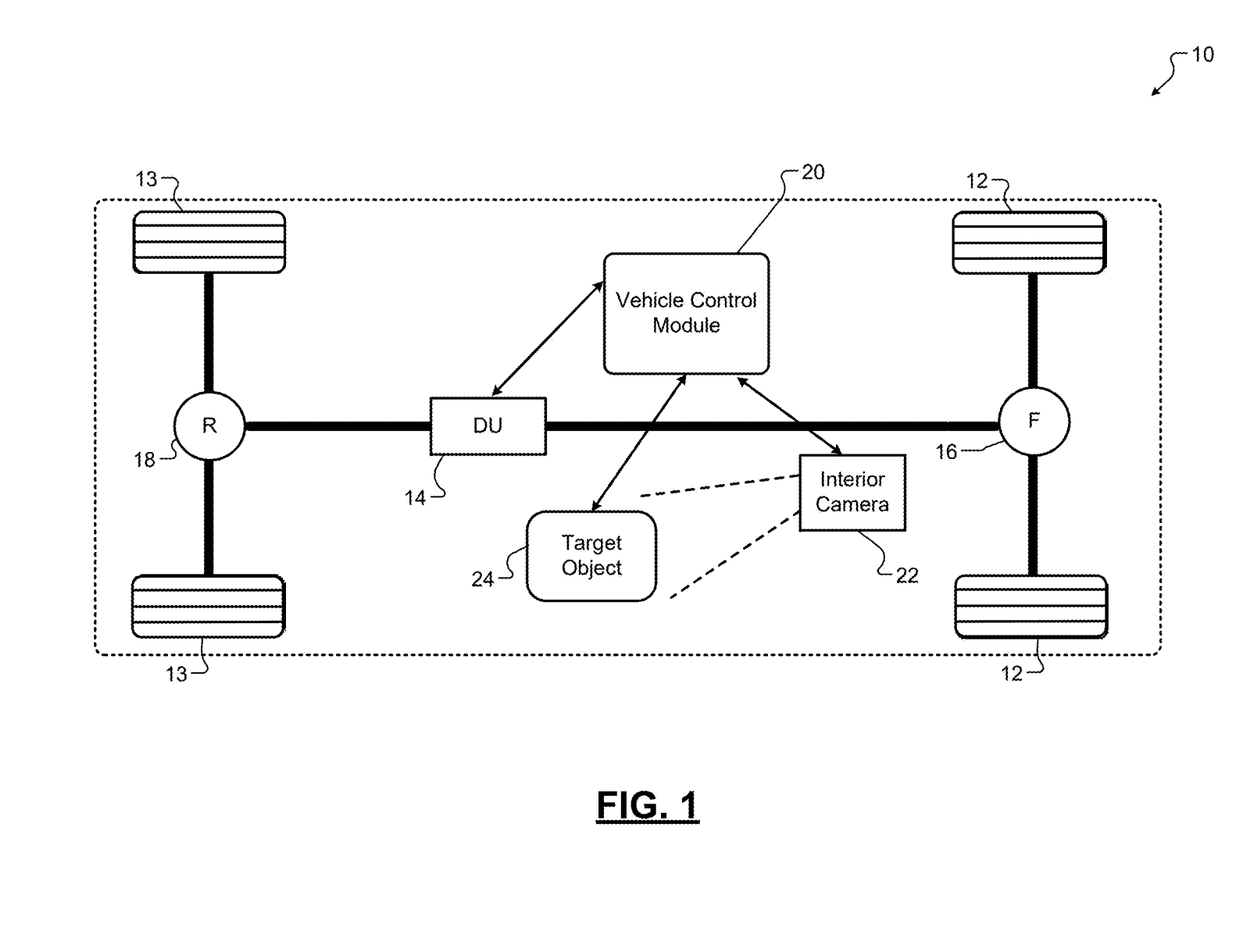
FIG. 1 is a diagram of an example vehicle including a vehicle interior camera.

Referring now to FIG. 1, a vehicle 10 includes front wheels 12 and rear wheels 13. In FIG. 1, a drive unit 14 selectively outputs torque to the front wheels 12 and/or the rear wheels 13 via drive lines 16, 18, respectively. The vehicle 10 may include different types of drive units. For example, the vehicle may be an electric vehicle such as a battery electric vehicle (BEV), a hybrid vehicle, or a fuel cell vehicle, a vehicle including an internal combustion engine (ICE), or other type of vehicle.

Some examples of the drive unit 14 may include any suitable electric motor, a power inverter, and a motor controller configured to control power switches within the power inverter to adjust the motor speed and torque during propulsion and/or regeneration. A battery system provides power to or receives power from the electric motor of the drive unit 14 via the power inverter during propulsion or regeneration.

While the vehicle 10 includes one drive unit 14 in FIG. 1, the vehicle 10 may have other configurations. For example, two separate drive units may drive the front wheels 12 and the rear wheels 13, one or more individual drive units may drive individual wheels, etc. As can be appreciated, other vehicle configurations and/or drive units can be used.

The vehicle control module 20 may be configured to control operation of one or more vehicle components, such as the drive unit 14 (e.g., by commanding torque settings of an electric motor of the drive unit 14). The vehicle control module 20 may receive inputs for controlling components of the vehicle, such as signals received from a steering wheel, an acceleration pedal, a brake pedal, etc. The vehicle control module 20 may monitor telematics of the vehicle for safety purposes, such as vehicle speed, vehicle location, vehicle braking and acceleration, etc.

The vehicle control module 20 may receive signals from any suitable components for monitoring one or more aspects of the vehicle, including one or more vehicle sensors (such as cameras, microphones, pressure sensors, steering wheel position sensors, braking sensors, location sensors such as global positioning system (GPS) antennas, wheel height and/or position sensors, accelerometers, etc.). Some sensors may be configured to monitor current motion of the vehicle, acceleration of the vehicle, braking of the vehicle, current steering direction of the vehicle, current height and/or position of one or more wheels, etc. In some examples, a vehicle interior camera 22 is configured to capture images of an interior of the vehicle 10, which may include capturing images of a target object 24 (e.g., a child restraint system).

The vehicle control module 20 may communicate with another device via a wireless communication interface, which may include one or more wireless antennas for transmitting and/or receiving wireless communication signals. For example, the wireless communication interface may communicate via any suitable wireless communication protocols, including but not limited to vehicle-to-everything (V2X) communication, Wi-Fi communication, wireless area network (WAN) communication, cellular communication, personal area network (PAN) communication, short-range wireless communication (e.g., Bluetooth), etc. The wireless communication interface may communicate with a remote computing device over one or more wireless and/or wired networks. Regarding the vehicle-to-vehicle (V2X) communication, the vehicle 10 may include one or more V2X transceivers (e.g., V2X signal transmission and/or reception antennas).

Figure 2:
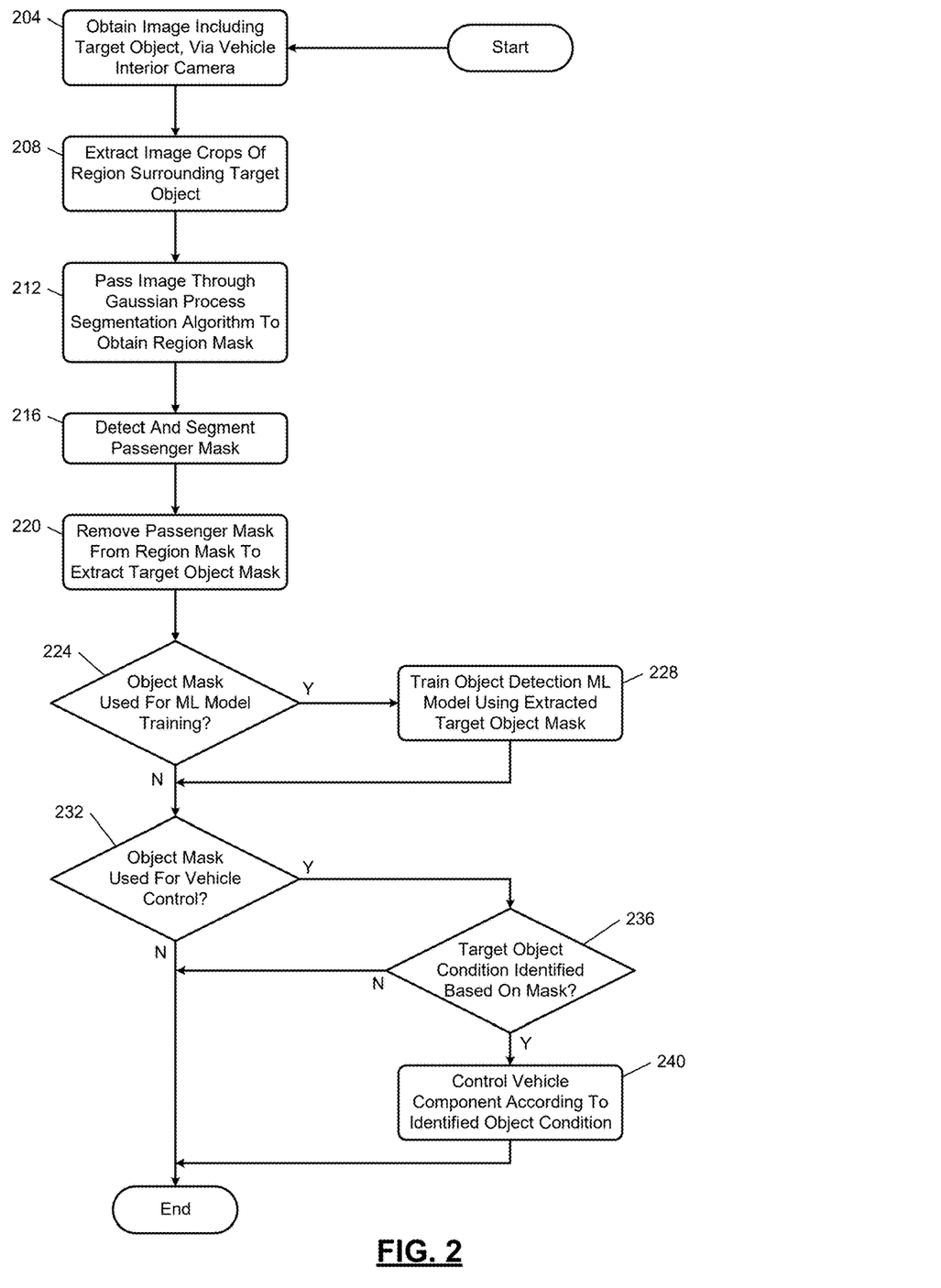
FIG. 2 is a flowchart depicting an example process for identifying target object masks for images captured by vehicle interior cameras.

FIG. 2 is a flowchart depicting an example process for identifying target object masks for images captured by vehicle interior cameras. The process may be performed by, for example, the vehicle control module 20 of FIG. 1. At 204, the process begins by obtaining an image including a target object, such as obtaining an image including the target object 24 from the vehicle interior camera 22.

At 208, the process includes extracting image crops of one or more regions surrounding the target object. For example, if the target object is a car seat (e.g., a child restraint system (CRS)), the process may crop a region of interest around the car seat.

The process includes passing the image through a Gaussian process (GP) segmentation algorithm at 212, to obtain a region mask. The GP segmentation algorithm may be any suitable model which uses a Gaussian process to generate a probability distribution of two-dimensional (2D) pixel regions based on the image, which may produce image segmentations which are coherent and consistent with the presence of salient objects of interest in the image. In other examples, other suitable image processing and segmentation algorithms may be used.

At 216, the process includes detecting and segmenting a passenger mask. For example, an image processing and segmentation algorithm may be applied to the image to detect a passenger (e.g., a child sitting on a car seat), and the passenger may be identified via segmentation.

The process removes the passenger mask from the region mask at 220, to extract a target object mask. For example, frame differences may be used to remove the passenger mask portion from an image, with the target object mask remaining in the image (e.g., a mask of the child restraint system, with the child mask portion removed).

At 224, the process includes determining whether the identified target object mask will be used for machine learning model training. For example, automated detection of target object masks using example processes described herein may facilitate generating training data for computer vision deep learning models, to avoid or reduce a need for manual identification of target objects (such as child restraint systems) by human reviewers.

If the target object mask is used for model training at 224, control proceeds to 228 to train an object detection machine learning model using the extracted target object mask. The machine learning model may be trained for any suitable purpose, such as improving identification of a presence of specified target objects in real-time based on a sequence of captured images from a vehicle interior camera. In some examples, the machine learning model may be trained to predict or localized target pixel masks. The machine learning model may include, but is not limited to, a segmentation model, a convolutional neural network configured to perform segmentation as a downstream task, etc.

At 232, the process includes determining whether the object mask is used for vehicle control. For example, detection of the presence of a target object may be used to control operation of one or more vehicle systems or features, to generate alerts, etc.

If the target object mask will be used for vehicle control at 232, control proceeds to 236 to determine whether a target object condition is identified or satisfied based on the target object mask. If so, control proceeds to 240 to control vehicle systems or features according to the identified object condition.

In some examples, the target object may include a child restraint system, a passenger seat belt, the presence of a child in the vehicle, etc. Example vehicle systems or features which may be controlled based on the identified presence of a target object in an image from the vehicle interior camera may include, but are not limited to, changing an airbag deployment setting (such as inhibiting deployment of an airbag when a child is detected as seated in a child restraint system), issuing a warning via a human machine interface (HMI) of the vehicle when a passenger is detected as not wearing a seatbelt, a child is seated in a front seat of the vehicle, a child remains in the vehicle after a key fob leaves a specified threshold proximity distance of the vehicle, etc.

Figure 3:
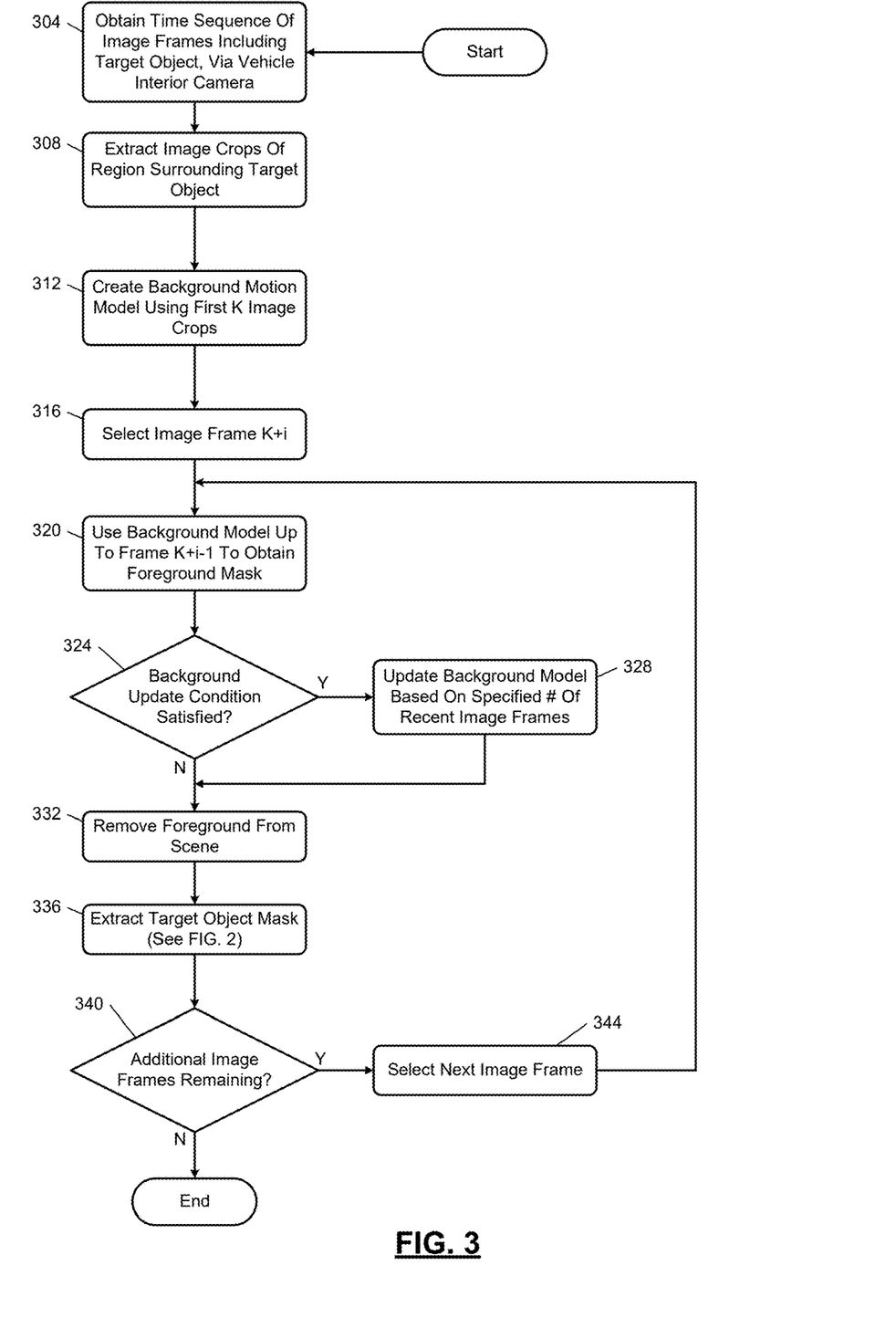
FIG. 3 is a flowchart depicting an example process for identifying target object masks by removing a foreground from an image.

FIG. 3 is a flowchart depicting an example process for identifying target object masks by removing a foreground from an image. The process may be performed by, for example, the vehicle control module 20 of FIG. 1. At 304, the process begins by obtaining a time sequence of image frames, such as obtaining multiple images including the target object 24 from the vehicle interior camera 22. The images may be captured at any suitable interval, such as every 100 milliseconds, every 500 milliseconds, every one second, every five seconds, every minute, etc.

At 308, control extracts image crops of a region surrounding the target object. For example, each frame in the sequence of images may be cropped separately. Control then creates a background motion model using the first K crops, at 312. For example, control may use any suitable background motion modeling algorithm to identify moving objects and/or static objects in a background of the images over time. The K image crops may be any suitable number such as ten cropped images, fifty cropped images, 100 cropped images, etc.

The process includes selecting an image frame K+i at 316. Control then uses the background model up to frame K+i−1 to obtain a foreground mask, at 320. For example, control may use the background motion model on a new frame (e.g., a most recently captured image from the vehicle interior camera), to generate a foreground mask, such as by identifying portions of the new image which are not a part of the previously identified background of the prior sequence of images.

At 324, control determines whether a background update condition is satisfied. If so, control updates the background motion model at 328 based on a specified number of recent image frames (such as the ten most recent image frames in a sequence, the fifty most recent image frames, etc.). Example background update conditions may include, but are not limited to, processing a specified number of image frames since a last background motion model update, detecting movement of the target object across a sequence of image frames exceeding a threshold movement distance, a specified period of time passing since the last background motion model update, etc. In some examples, the background motion model may be updated when, for example, a child restraint seat or booster seat is shifted due to movement of a child.

The process includes removing the foreground from the scene at 332. For example, after obtaining the foreground mask at 320, the foreground mask may be used to remove a portion of the image corresponding to the foreground mask at 332. Control may then optionally extract a target object mask at 336 (e.g., a car seat object may be identified in a background after removing a child from a foreground of the image). The target object mask may be extracted by executing, for example, the process of FIG. 2 on an image after the foreground is removed from the image at 332.

At 340, control determines whether any additional frames remain for processing, such as subsequent frames in a time sequence of images. For example, the process may identify a target object first, then continually monitor a presence of the object as remaining in the background. If control determines that additional frames remain for processing, control selects a next image frame in the sequence at 344, and returns to 320 to obtain a foreground mask for the selected frame (e.g., frame i) using the background model up to frame K+i−1.

Figure 4:
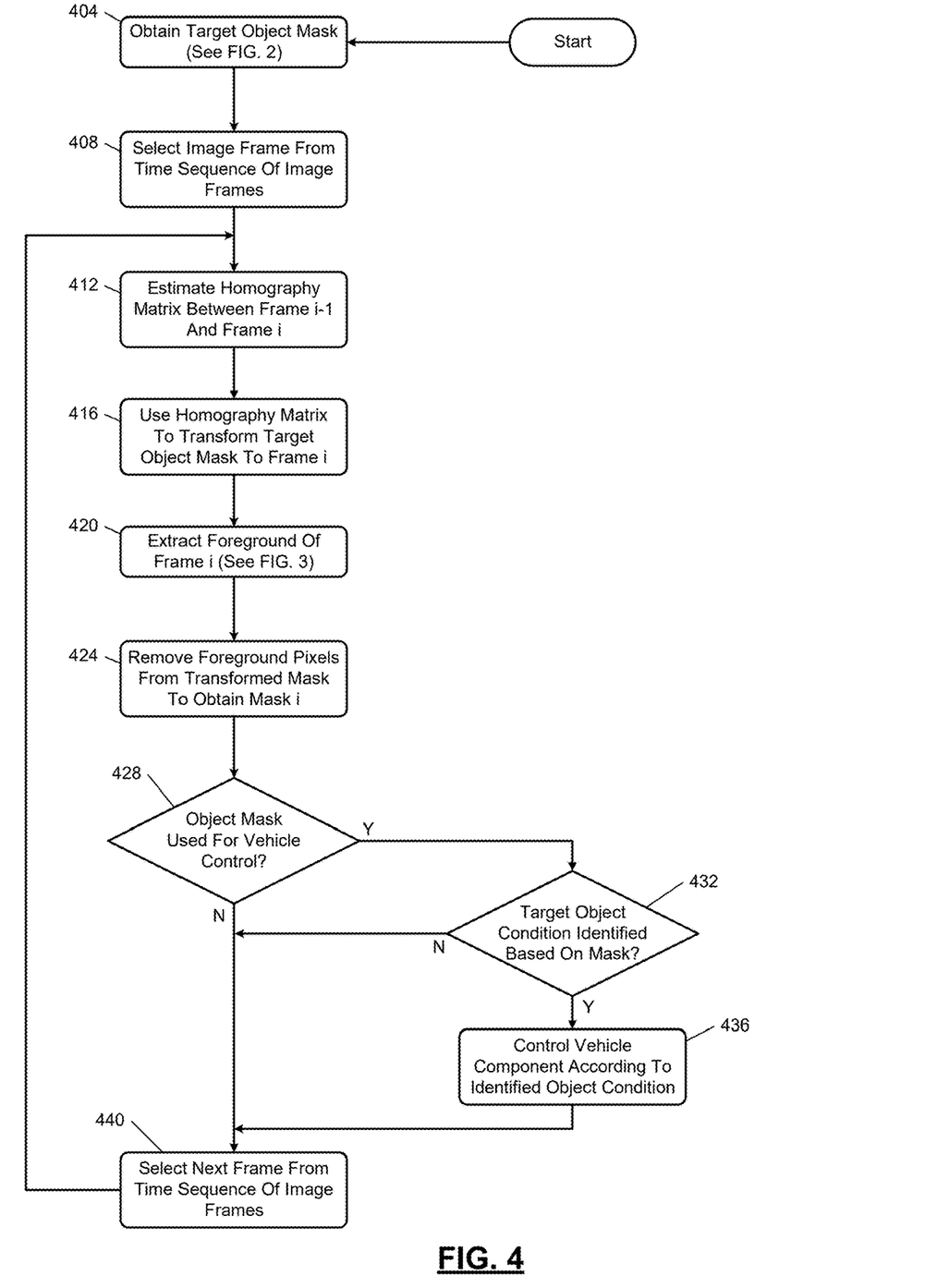
FIG. 4 is a flowchart depicting an example process for identifying target object masks using a homography matrix.

FIG. 4 is a flowchart depicting an example process for identifying target object masks using image registration via estimating a homography matrix. The process may be performed by, for example, the vehicle control module 20 of FIG. 1. At 404, the process begins by obtaining a target object mask. For example, the process of FIG. 2 may be used to extract a mask for a target object in an image, such as a child restraint system.

At 408, control selects an image frame from a time sequence of image frames (such as a video captured by a vehicle interior camera). Control then estimates a homography matrix at 412 between frame i−1 and frame i. For example, control may estimate a 3×3 homography matrix $H_i^*$ between the frames. An example equation for estimating the homography matrix is:

$$H_i^* = \arg\min_H \|H(I_{i-1})(x, y) - I_i(x, y)\|_2$$

In some examples, the homography matrix may be solved using gradient descent or another iterative method. At 416, control uses the homography matrix to transform the target object mask to frame i. For example, the original target object mask may be projected to a current frame i using the homography matrix, such as by transforming the target object mask to coordinates of frame i using:

$$\prod_1^i H_i^*$$

Control extracts a foreground of frame i at 420. For example, the process illustrated in FIG. 3 may be applied to the image of frame i after transformation using the homography matrix, to extract a foreground mask from the transformed frame i. The foreground pixels are then removed from the transformed mask at 424, to obtain mask i.

At 428, control determines whether the object mask is used for vehicle control. For example, the mask output from 424 may be used for tracking in a live vehicle environment, such as detecting the presence or absence of a child restraint system during operation of the vehicle.

If the object mask is used for vehicle control at 428, control proceeds to 432 to determine whether a target object condition is satisfied based on the object mask. If the target object condition is satisfied, the process controls the vehicle component (e.g., system or feature) according to the identified object condition. For example, as described in examples above, if a target object condition is satisfied such as the presence of a child restraint system, vehicle systems or features may be controlled according to the detected target object (such as inhibiting deployment of an airbag when a child restraint system is detected, or issuing an alert via an HMI when unsafe child or passenger object conditions are detected). Control then selects a next frame from the time sequence of images at 440, and returns to 412 to estimate a homography matrix between the next adjacent frames.

Figure 5A:
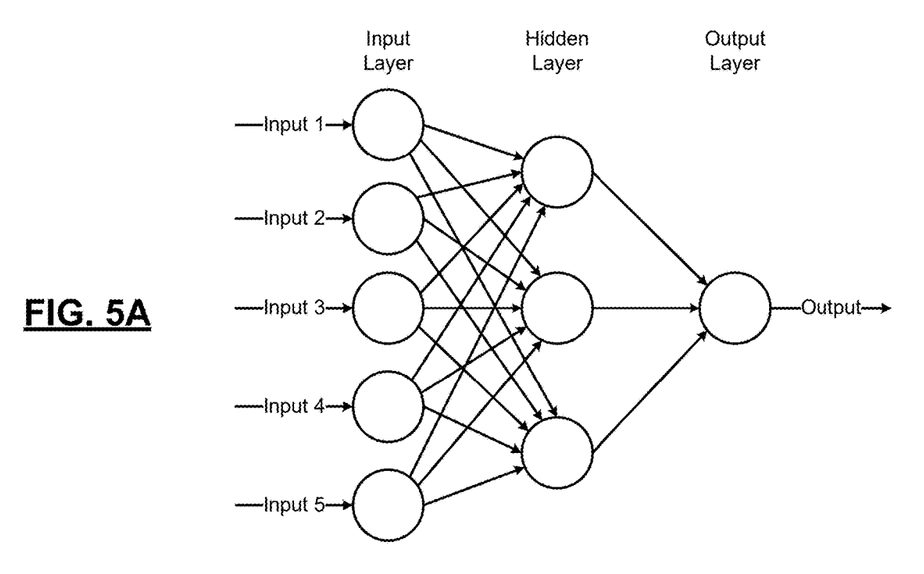
FIGS. 5A and 5B are graphical representations of example neural networks for predicting target object masks.
Figure 5B:
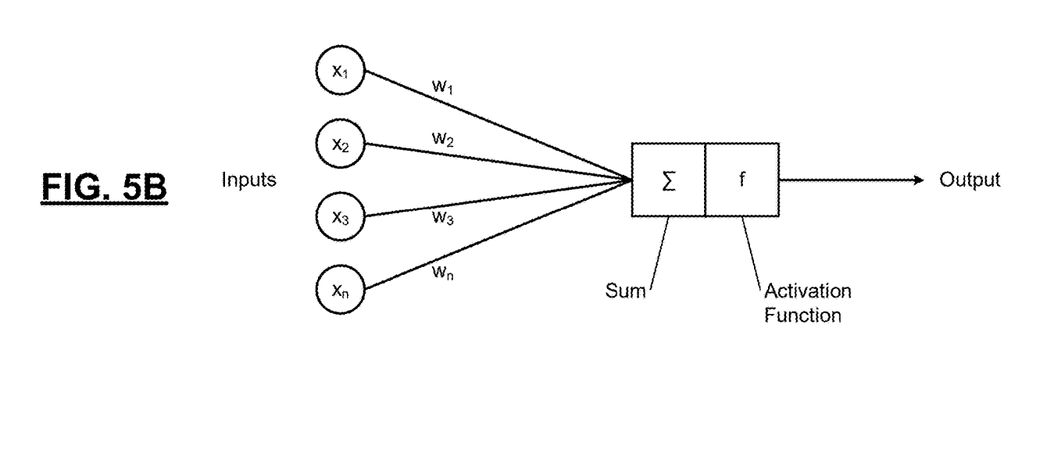

FIGS. 5A and 5B show an example of a neural network used to generate models such as those described above, using machine learning techniques. Machine learning is a method used to devise complex models and algorithms that lend themselves to prediction (for example, patient and provider matching predictions). The models generated using machine learning, such as those described above, can produce reliable, repeatable decisions and results, and uncover hidden insights through learning from historical relationships and trends in the data.

The purpose of using the neural-network-based model, and training the model using machine learning as described above, may be to directly predict dependent variables without casting relationships between the variables into mathematical form. The neural network model includes a large number of virtual neurons operating in parallel and arranged in layers. The first layer is the input layer and receives raw input data. Each successive layer modifies outputs from a preceding layer and sends them to a next layer. Each successive layer optionally applies non-linear transformation functions to the outputs from a preceding layer before sending them to the next layer. The last layer is the output layer and produces output of the system.

FIG. 5A shows a fully connected neural network, where each neuron in a given layer is connected to each neuron in a next layer. In the input layer, each input node is associated with a numerical value, which can be any real number. In each layer, each connection that departs from an input node has a weight associated with it, which can also be any real number (see FIG. 5B). In the input layer, the number of neurons equals number of features (columns) in a dataset. The output layer may have multiple continuous outputs.

The layers between the input and output layers are hidden layers. The number of hidden layers can be one or more (one hidden layer may be sufficient for most applications). A neural network with no hidden layers can represent linear separable functions or decisions. A neural network with one hidden layer can perform continuous mapping from one finite space to another. A neural network with two hidden layers can approximate any smooth mapping to any accuracy.

The number of neurons can be optimized. At the beginning of training, a network configuration is more likely to have excess nodes. Some of the nodes may be removed from the network during training that would not noticeably affect network performance. For example, nodes with weights approaching zero after training can be removed (this process is called pruning). The number of neurons can cause underfitting (inability to adequately capture signals in dataset) or over-fitting (insufficient information to train all neurons; network performs well on training dataset but not on test dataset).

Various methods and criteria can be used to measure performance of a neural network model. For example, root mean squared error (RMSE) measures the average distance between observed values and model predictions. Coefficient of Determination (R2) measures correlation (not accuracy) between observed and predicted outcomes. This method may not be reliable if the data has a large variance. Other performance measures include irreducible noise, model bias, and model variance. A high model bias for a model indicates that the model is not able to capture true relationship between predictors and the outcome. Model variance may indicate whether a model is stable (a slight perturbation in the data will significantly change the model fit). The neural network can receive inputs, e.g., vectors, which can be used to generate models that can be used with image processing and target object mask identification based on images from vehicle interior cameras.

Figure 6:
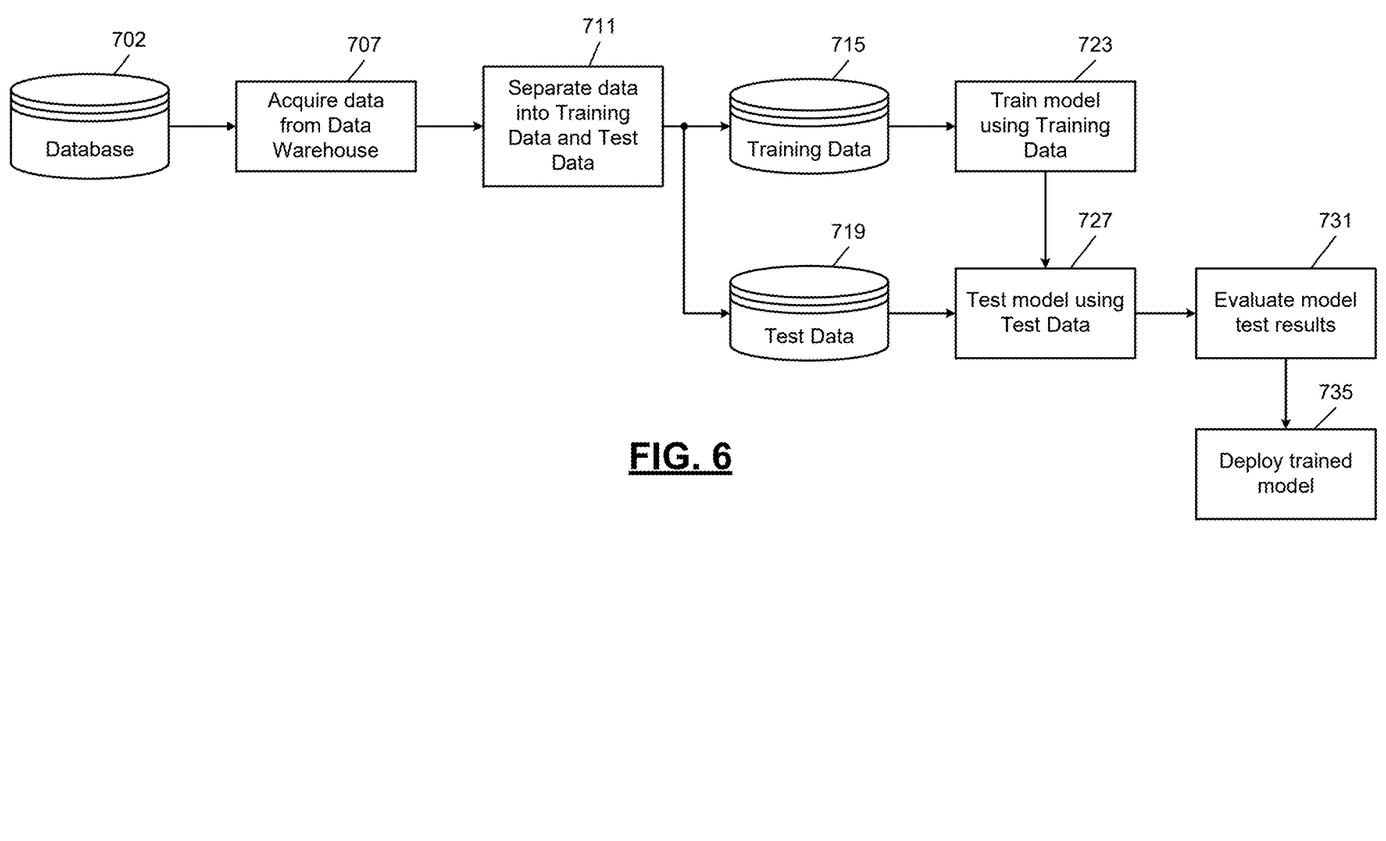
FIG. 6 is a flowchart illustrating an example process for training a machine learning model.

FIG. 6 illustrates an example process for generating a machine learning model. At 707, control obtains data from a database 702 (e.g., a data warehouse). The data may include any suitable data for developing machine learning models.

At 711, control separates the data obtained from the database 702 into training data 715 and test data 719. The training data 715 is used to train the model at 723, and the test data 719 is used to test the model at 727. Typically, the set of training data 715 is selected to be larger than the set of test data 719, depending on the desired model development parameters. For example, the training data 715 may include about seventy percent of the data acquired from the database 702, about eighty percent of the data, about ninety percent, etc. The remaining thirty percent, twenty percent, or ten percent, is then used as the test data 719.

Separating a portion of the acquired data as test data 719 allows for testing of the trained model against actual output data, to facilitate more accurate training and development of the model at 723 and 727. The model may be trained at 723 using any suitable machine learning model techniques, including those described herein, such as random forest, generalized linear models, decision tree, and neural networks.

At 731, control evaluates the model test results. For example, the trained model may be tested at 727 using the test data 719, and the results of the output data from the tested model may be compared to actual outputs of the test data 719, to determine a level of accuracy. The model results may be evaluated using any suitable machine learning model analysis, such as the example techniques described further below.

After evaluating the model test results at 731, the model may be deployed at 735 if the model test results are satisfactory. Deploying the model may include using the model to make predictions for a large-scale input dataset with unknown outputs. If the evaluation of the model test results at 731 is unsatisfactory, the model may be developed further using different parameters, using different modeling techniques, using other model types, etc. The machine learning model method of FIG. 6 can receive inputs, e.g., vectors, which can be used to generate models that can be used, for example, image processing and target object mask identification based on images from vehicle interior cameras.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A vehicle interior camera system comprising:
   memory configured to store at least one Gaussian process image segmentation model;
   a vehicle interior camera configured to capture images of at least a portion of an interior of a vehicle; and
   a vehicle control module configured to:
   obtain an image of at least a portion of the interior of the vehicle, from the vehicle interior camera;
   extract one or more image crops of a region surrounding a target object in the image;
   detect and segment a passenger mask in the image;
   supply the image to the at least one Gaussian process image segmentation model to obtain a region mask associated with the region surrounding the target object;
   obtain a time sequence of k images from the vehicle interior camera, and generate a background motion model according to image crops from each of the k images;
   apply the background motion model to the time sequence of k images to generate a foreground mask, and remove the foreground mask from the image;
   subsequent to remove the foreground mask from the image, remove the passenger mask from the region mask to extract a target object mask;
   identify a target object condition according to the target object mask; and
   control at least one vehicle system or feature in response to identification of the target object condition.

2. The vehicle interior camera system of claim 1, wherein the vehicle control module is configured to output the target object mask to train a machine learning model to identify the target object in a sequence of images.

3. The vehicle interior camera system of claim 1, wherein the target object includes at least one of a child restraint system (CRS) and a passenger seat belt.

4. The vehicle interior camera system of claim 3, wherein controlling the vehicle system or feature includes inhibiting deployment of an airbag in response to detection of a child in a child restraint system.

5. The vehicle interior camera system of claim 3, further comprising a human machine interface (HMI) of the vehicle, wherein:
   controlling the vehicle system or feature includes generating an alert via the human machine interface; and
   the alert includes at least one of a warning not to put a child in a front seat of the vehicle, a warning that a child is still in the vehicle after a key fob leaves the vehicle, or a warning for a passenger to wear a seat belt while the vehicle is in motion.

6. The vehicle interior camera system of claim 1, wherein the vehicle control module is configured to:
   determine whether a background motion model update condition is satisfied; and
   update the background motion model based on a specified number of recent image frames in response to the background motion model update condition being satisfied.

7. The vehicle interior camera system of claim 6, wherein the background motion model update condition includes at least one of processing a specified number of image frames since a last background motion model update, and detecting movement of the target object across a sequence of image frames exceeding a threshold movement distance.

8. The vehicle interior camera system of claim 1, wherein the vehicle control module is configured to:
   estimate a homography matrix between adjacent frames in the time sequence of k images; and
   transform the target object mask from a first one of the adjacent frames to a next one of the adjacent frames using the homography matrix.

9. A method of processing images of a vehicle interior camera, the method comprising:
   obtaining an image of at least a portion of an interior of a vehicle, from a vehicle interior camera;
   extracting one or more image crops of a region surrounding a target object in the image;
   detecting and segmenting a passenger mask in the image;
   supplying the image to at least one Gaussian process image segmentation model to obtain a region mask associated with the region surrounding the target object;
   obtaining a time sequence of k images from the vehicle interior camera, and generating a background motion model according to image crops from each of the k images;
   applying the background motion model to the time sequence of k images to generate a foreground mask, and removing the foreground mask from the image;
   subsequent to removing the foreground mask from the image, removing the passenger mask from the region mask to extract a target object mask;
   identifying a target object condition according to the target object mask; and
   controlling at least one vehicle system or feature in response to identification of the target object condition.

10. The method of claim 9, further comprising supplying the target object mask to a machine learning model to train the machine learning model to identify the target object in a sequence of images.

11. The method of claim 9, wherein the target object includes at least one of a child restraint system (CRS) and a passenger seat belt.

12. The method of claim 11, wherein controlling the vehicle system or feature includes inhibiting deployment of an airbag in response to detection of a child in a child restraint system.

13. The method of claim 11, wherein:
controlling the vehicle system or feature includes generating an alert a human machine interface (HMI); and
the alert includes at least one of a warning not to put a child in a front seat of the vehicle, a warning that a child is still in the vehicle after a key fob leaves the vehicle, or a warning for a passenger to wear a seat belt while the vehicle is in motion.

14. The vehicle interior camera system of claim 1, wherein the target object is a child restraint system (CRS).

15. The vehicle interior camera system of claim 1, wherein the target object is a passenger seat belt.

16. The vehicle interior camera system of claim 14, further comprising a human machine interface (HMI) of the vehicle, wherein:
controlling the vehicle system or feature includes generating an alert via the human machine interface; and
the alert includes a warning not to put a child in a front seat of the vehicle.

17. The vehicle interior camera system of claim 14, further comprising a human machine interface (HMI) of the vehicle, wherein:
controlling the vehicle system or feature includes generating an alert via the human machine interface; and
the alert includes a warning that a child is still in the vehicle after a key fob leaves the vehicle.

18. The vehicle interior camera system of claim 15, further comprising a human machine interface (HMI) of the vehicle, wherein:
controlling the vehicle system or feature includes generating an alert via the human machine interface; and
the alert includes a warning for a passenger to wear a seat belt while the vehicle is in motion.

19. The method of claim 9, wherein the target object is a passenger seat belt.

20. A method of processing images of a vehicle interior camera, the method comprising:
obtaining an image of at least a portion of an interior of a vehicle, from a vehicle interior camera;
extracting one or more image crops of a region surrounding a target object in the image;
detecting and segmenting a passenger mask in the image;
supplying the image to at least one Gaussian process image segmentation model to obtain a region mask associated with the region surrounding the target object;
obtaining a time sequence of k images from the vehicle interior camera, and generating a background motion model according to image crops from each of the k images;
applying the background motion model to the time sequence of k images to generate a foreground mask, and removing the foreground mask from the image;
subsequent to removing the foreground mask from the image, removing the passenger mask from the region mask to extract a target object mask;
identifying a target object condition according to the target object mask; and
controlling at least one vehicle system or feature in response to identification of the target object condition, wherein the target object is a child restraint system (CRS).

* * * * *